United States Patent
Houk

(10) Patent No.: US 6,575,213 B1
(45) Date of Patent: Jun. 10, 2003

(54) MULTI-FUNCTIONAL WORK SUPPORT

(75) Inventor: David A. Houk, Norton, OH (US)

(73) Assignee: Rubbermaid Incorporated, Wooster, OH (US)

( * ) Notice: Subject to any disclaimer, the term of this patent is extended or adjusted under 35 U.S.C. 154(b) by 0 days.

(21) Appl. No.: 09/904,633

(22) Filed: Jul. 13, 2001

(51) Int. Cl.[7] ................................................ B25H 1/06
(52) U.S. Cl. ................ 144/287; 182/182.4; 182/182.1; 269/289 R
(58) Field of Search ............................. 144/287, 286.1; 182/181.1, 182.1, 182.4; 248/168; 269/88, 289 R; 193/42

(56) References Cited

U.S. PATENT DOCUMENTS

| | | | |
|---|---|---|---|
| 3,583,588 A | * 6/1971 | Royal, Sr. .................. | 193/35 R |
| 4,039,064 A | 8/1977 | Kirby ........................... | 193/42 |
| 4,884,791 A | 12/1989 | Callender ..................... | 269/88 |
| 5,064,156 A | 11/1991 | Handler et al. ............. | 248/168 |
| 5,299,656 A | * 4/1994 | Grill ........................ | 182/186.4 |
| 5,337,875 A | * 8/1994 | Lee ............................ | 193/35 C |
| 5,435,411 A | 7/1995 | Borgatti ...................... | 182/181 |
| 5,441,091 A | * 8/1995 | Collins ..................... | 144/286.1 |
| 5,984,047 A | * 11/1999 | Rogers ........................ | 108/132 |
| 6,179,024 B1 | * 1/2001 | Yang ........................... | 144/287 |
| 6,193,044 B1 | * 2/2001 | Larsen ...................... | 193/35 R |

* cited by examiner

*Primary Examiner*—Allen Ostrager
*Assistant Examiner*—Shelley Self
(74) *Attorney, Agent, or Firm*—Marshall, Gerstein & Borun

(57) ABSTRACT

A work support including a frame and a header coupled to the frame and moveable between a first position and a second position. The header includes a first work surface deployed when the header is in a first position and a second work surface deployed when the header is in a second position.

10 Claims, 4 Drawing Sheets

MULTI-FUNCTIONAL WORK SUPPORT

FIELD OF THE INVENTION

The present invention relates to a work support, and more particularly to an adjustable work support.

BACKGROUND OF THE INVENTION

Work supports are generally known and typically include a frame and a single work surface. Some known work supports are made from metal components and provide only one type of work surface. However, such work supports have several disadvantages. For example, most known work supports function for only a single purpose and provide for a minimum amount of adjustment. Also, adjustments, if possible, are complex and laborious, and easily come out of alignment during use. Further, known adjustment mechanisms are made from metal components that degrade or corrode over time.

An example of one known work support is shown in U.S. Pat. No. 5,435,411, which includes two work surfaces: a row of discrete ball bearings and a roller. The ball bearings are mounted to a base member and the roller is mounted between two brackets that are rotatably secured to the base by two knurled knobs. The brackets (and roller) may be rotated from the upright position to use the ball bearing work surface. However, this design for a work support tends to be expensive to manufacture and assemble, difficult to use and align properly, and has stability and corrosion problems.

Accordingly, providing an adjustable, multi-functional, inexpensive and reliable work support that avoids the above-referenced and other problems would represent a significant advance in the art.

SUMMARY OF THE INVENTION

A primary feature of the present invention is to provide an inexpensive, easy-to-manufacture and aesthetically pleasing work support which overcomes the above-noted disadvantages.

Another feature of the present invention is to provide a multi-functional work support that may be quickly and easily adjusted to provide a variety of work surfaces.

Yet another feature of the present invention is to provide a multi-functional work support with an adjustment mechanism that resists corrosion.

A different feature of the present invention is to provide for a multi-functional work support that is easy to reconfigure and better maintains its set configuration during use.

How these and other advantages and features of the present invention are accomplished (individually, collectively, or in various subcombinations) is described in the following detailed description of the preferred and other exemplary embodiments, taken in conjunction with the FIGURES. Generally, however, they are accomplished in a work support, including a frame and a header coupled to the frame and moveable between a first position and a second position. The header includes a first work surface which is deployed when the header is in the first position, and a second work surface which is deployed when the header is in the second position.

These and other advantages and features of the present invention may also be accomplished in a work support including a frame having a bracket, and a header rotatably coupled to the bracket by a pair of projections engaged with corresponding apertures or recesses. The header includes a first work surface located on a first end, and a second work surface located on a second end. The header is configured to rotate between a first position so that the first work surface is deployed, and a second position in which the second work surface is deployed.

These and other advantages and features of the present invention may further be accomplished in a work support including a frame having a bracket, and a header rotatably coupled to the bracket. The header also includes a first work surface having a single roller, and a second work surface having a plurality of rollers with axes of rotation perpendicular to an axis of rotation of the single roller. The header is rotatable about a pair of projections between a first position and a second position. The first work surface is deployed when the header is in the first position, and the second work surface is deployed when the header is in the second position.

The present invention further relates to various features and combinations of features shown and described in the disclosed embodiments. Other ways in which the objects and features of the present invention are accomplished will be described in the following specification or will become apparent to those skilled in the art after they have read this specification. Such other ways are deemed to fall within the scope of the present invention if they fall within the scope of the claims which follow.

DETAILED DESCRIPTION OF PREFERRED AND OTHER EXEMPLARY EMBODIMENTS

Before proceeding to the detailed description of the preferred and exemplary embodiments, several comments can be made about the general applicability and the scope thereof.

First, while the components of the disclosed embodiments will be illustrated as a free-standing work support, the features of the present invention have a much wider applicability. For example, the multi-functional header can include any of a variety of support surfaces in a variety of industrial, home, office, or other products which employ, or could take advantage of, one or more work surfaces. Also, features of the work support may be used in other devices that would take advantage of the multi-functional features (e.g., the header being mounted to a work bench, on a machine tool, etc.). Further, the size of the various components and the type of work surface can be widely varied.

Second, the particular materials used to construct the exemplary embodiments are also illustrative. For example, structural foam polypropylene molded using a low pressure process is the preferred method and material for making the header and frame, but other materials can be used, including other structural foam polymer materials, other thermoplastic resins such as polypropylene, polyethylene, high density polyethylene, acrylonitrile butadiene styrene ("ABS"), acetal, polyurethane, nylon, any of a variety of homopolymer plastics, copolymer plastics, plastics with special additives, filled plastics, etc. Also, other molding operations may be used to form these components, such as injection molding, rotational molding, etc. A plastic construction eliminates corrosion associated with metal, and eliminates warping, splitting or painting associated with wood, but metal and wood are within the scope of the invention. The roller(s) can be made of plastic, die-cast alloys, wood, etc. The adjustable column could also be made with a variety of shapes and configurations, such as a round configuration with a key and slot system to prevent twisting.

Proceeding now to descriptions of the preferred and exemplary embodiments, FIGS. 1–4 show a multi-functional work support 10 according to a preferred embodiment. Work support 10 includes a header 12 coupled to a frame 14 and configured to provide a plurality of work surfaces 16, 18 useful for a variety of work tasks. Work support 10 is configured to provide a multitude of different work surfaces that may be selectively arranged according to a particular use.

Figure 2:
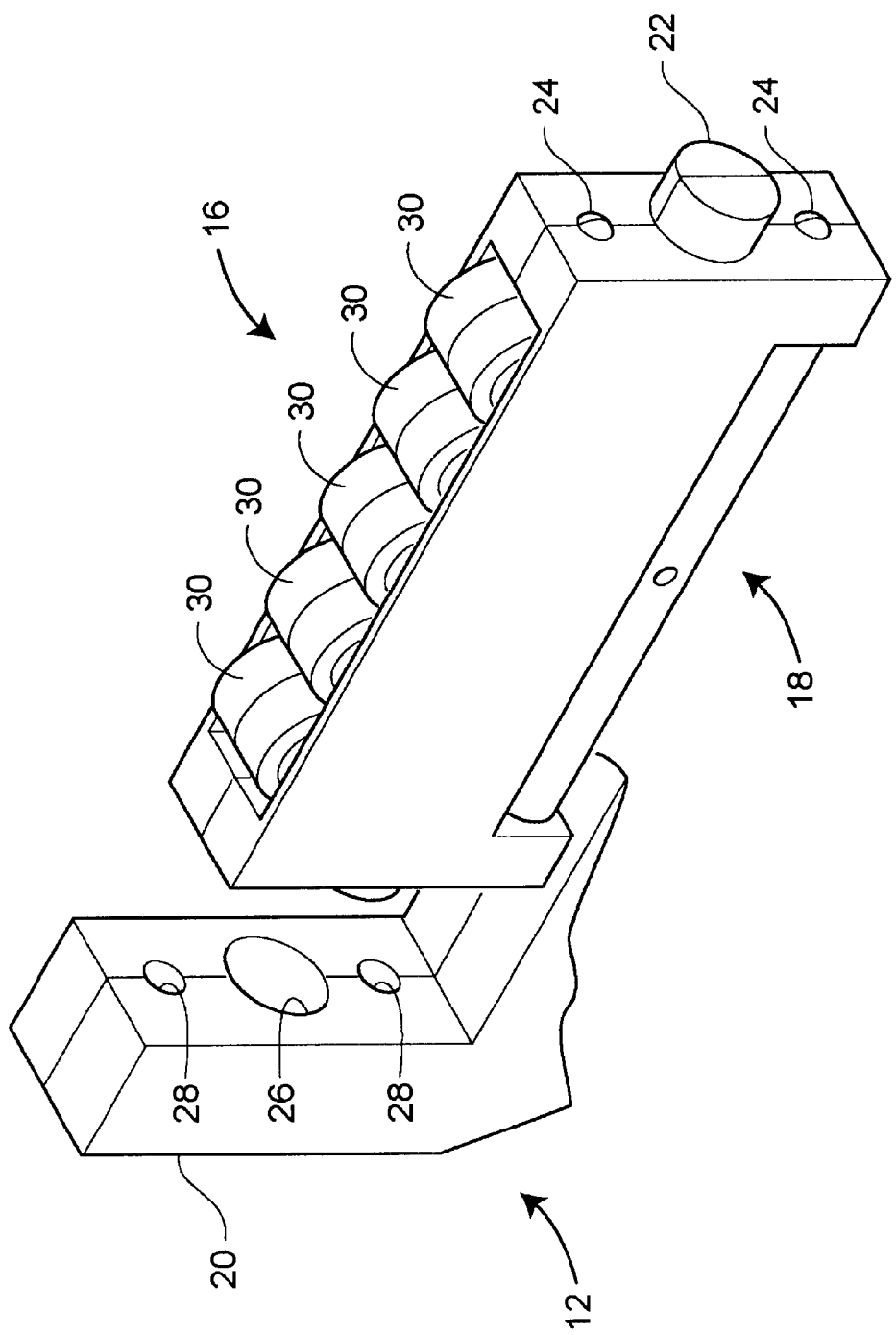
FIG. 2 is an exploded fragmentary perspective view of a header and bracket for the adjustable work support with the header rotated to provide a different work surface shown in FIG. 1.

FIG. 2 shows header 12 exploded from the head assembly. Header 12 is configured to allow a quick and easy changeover from one configuration or orientation to another. Multiple work surface orientations reduce required storage space and shop clutter and improve shop organization and safety by reducing the number of separate work supports. Header 12 is adjustably mounted to a bracket 20 and includes plurality of work surfaces 16, 18. According to alternative embodiments, three, four, or more work surfaces could be provided, for example, by providing headers of triangular, square, etc. cross-sections.

According to a preferred embodiment, each side of header 12 includes a projection 22 and one or more detents 24. Projections 22 are cylindrical in shape and are configured to engage recesses or apertures 26 in bracket 20 to allow header 12 to be rotated about projections 22. Detents 24 are semi-spherical and are configured to engage corresponding apertures or recesses 28 in bracket 20 so that header 12 may be held in a particular orientation. Detents 24 are integrally formed with header 12 and are configured to deflect when being rotated through bracket 20. According to an alternative embodiment, projections 22 and/or detents 24 may be located on bracket 20. Alternatively, projections 22 and/or detents 24 are separately formed and attached by adhesive, welding, fasteners, or the like. According to an alternative embodiment, detents 24 are spring-loaded plunger pins that are configured to retract when header 12 is being rotated.

Figure 1:
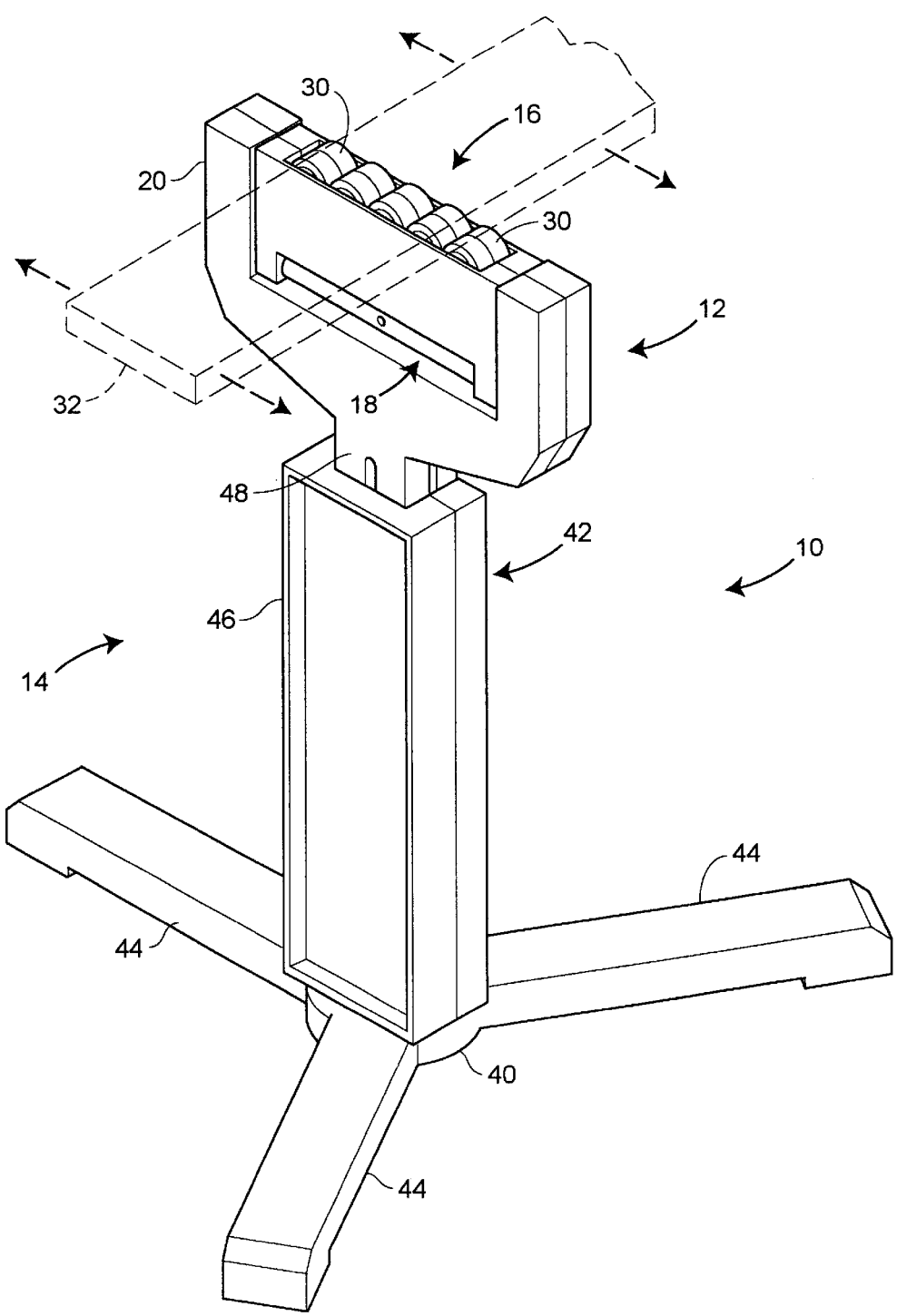
FIG. 1 is a perspective view of the adjustable work support according to a preferred embodiment.
Figure 3:
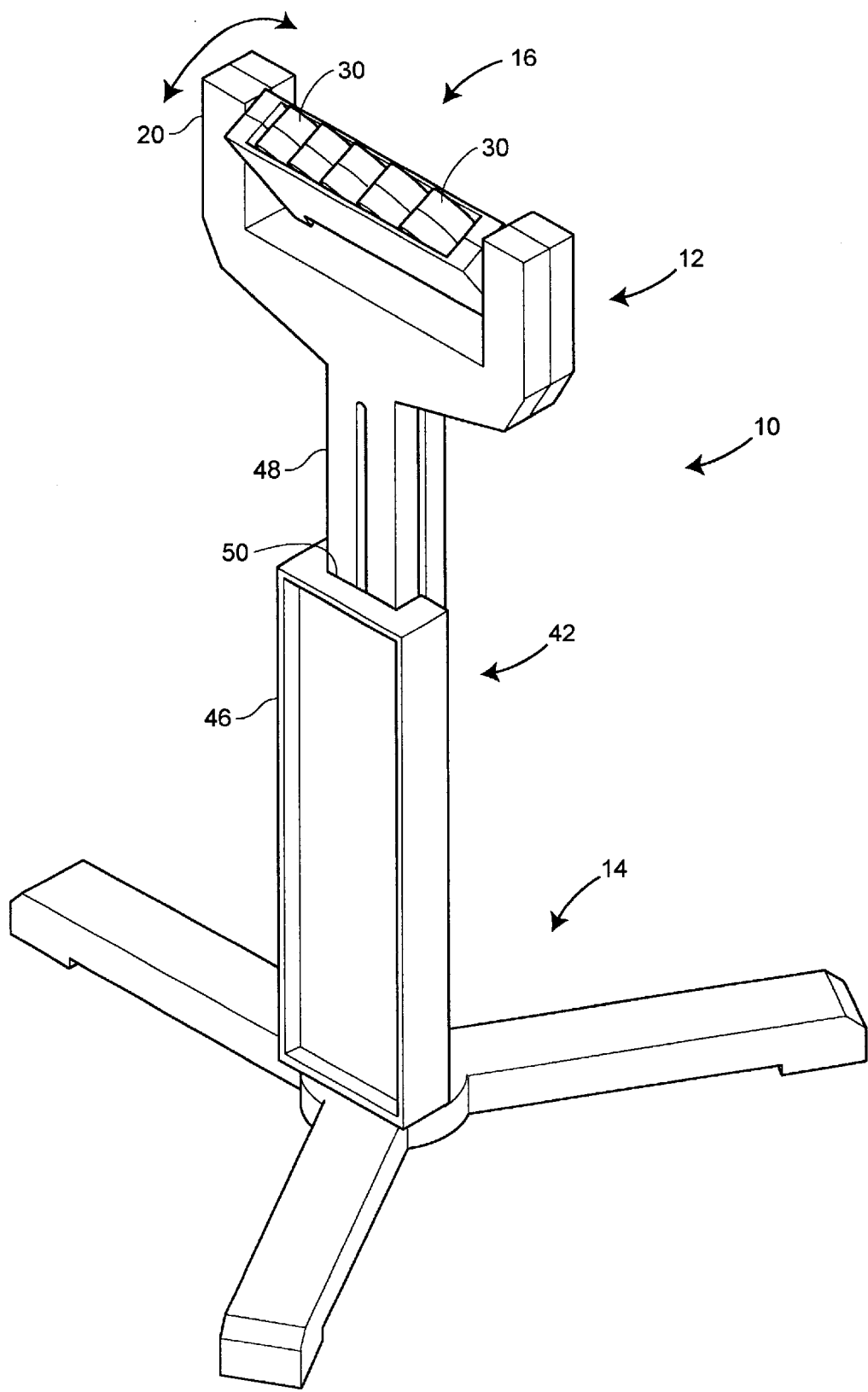
FIG. 3 is a perspective view of the adjustable work support of FIG. 1 with the header being rotated.
Figure 4:
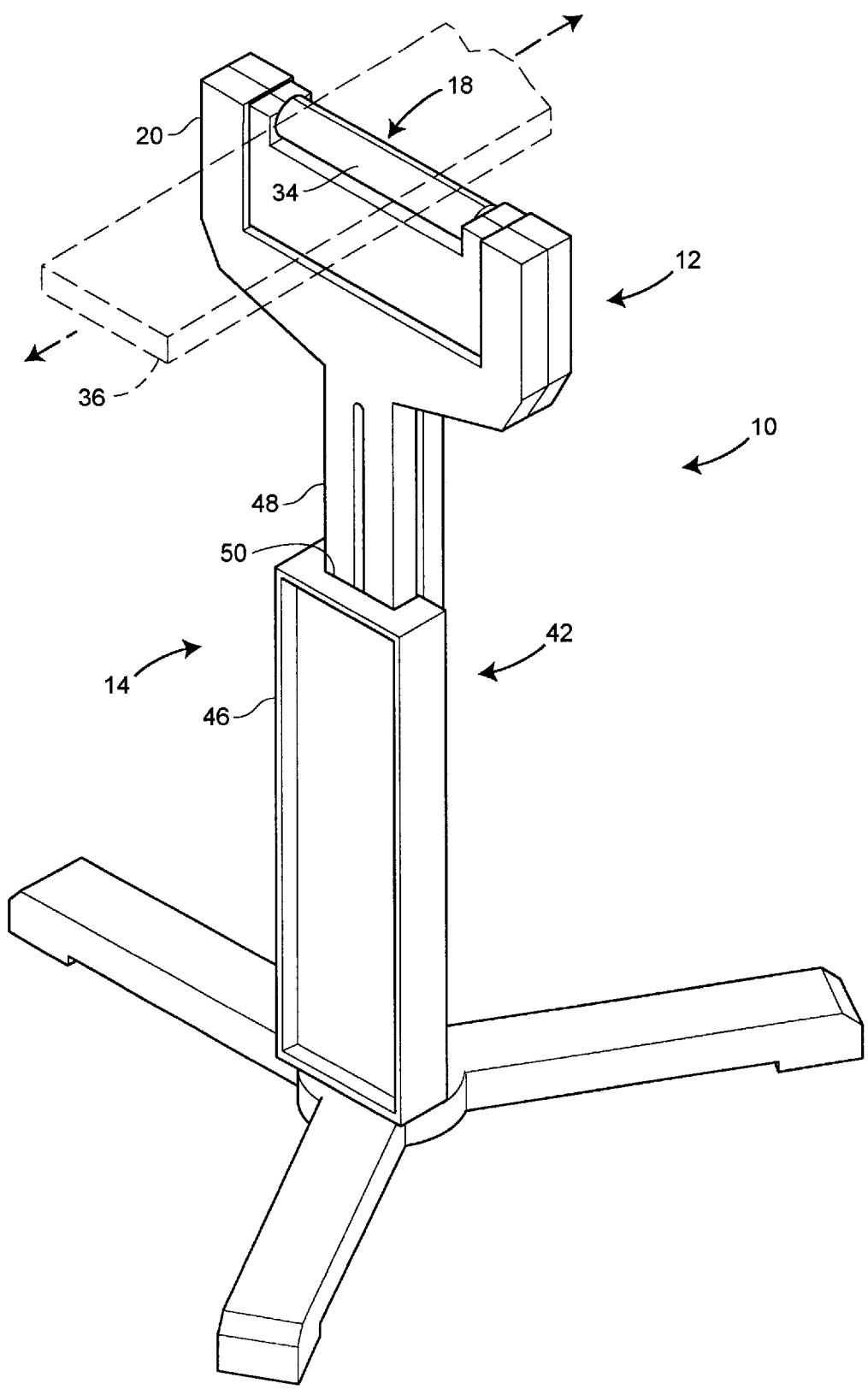
FIG. 4 is a perspective view of the adjustable work support with the header rotated to provide a different work surface than that shown in FIG. 1.

Work surfaces 16, 18 may be any of a variety of functional surfaces for any of a variety of associated uses or work tasks. For example, as shown in FIG. 1, work surface 16 includes a plurality of rollers 30 mounted so that their axes are perpendicular to projections 22. As such, work support 10 is intended to be used in a "cross-cut" operation wherein a work piece 32 (shown in broken lines) is fed widthwise into a machine (e.g., table saw, joiner, planer, etc.), as illustrated by the arrows. FIG. 3 shows work support 10 being converted for a different operation by rotation of header 12 by about 180°. As shown in FIG. 4, an alternative work surface 18 includes a single roller 34 mounted so that its axis is generally parallel with projections 22. As such, work support 10 is intended to be used in a "ripping" operation wherein a work piece 36 (shown in broken lines) is fed lengthwise into a machine, as illustrated by the arrows.

Alternatively, the work surface may have any of a variety of configurations and combinations of features adaptable for use in a variety of potential operations. For example, the work surface may be configured with "V-shaped" members to accommodate curved or circular work pieces. The surfaces of the "V-shaped" work surface may include rollers to assist in moving the work pieces.

Frame 14 includes a base 40 and a column 42 that extends upward from base 40. According to a preferred embodiment, base 40 includes a plurality of legs 44 (three are shown) for stable support and to accommodate uneven floor surfaces. Alternatively, any of a variety of bases 40 or a variety of leg configurations may be used.

Column 42 includes a lower portion 46 attached to base 40 and an upper portion 48 adjustably coupled to lower portion 46. According to a preferred embodiment, upper portion 48 telescopically moves to adjust the height of header 12 and includes bracket 20 configured to receive header 12 in a variety of orientations.

According to an exemplary embodiment, lower portion 46 of column 42 includes a channel 50 configured to receive upper portion 48. Preferably, channel 50 and upper portion 48 are rectangular to prevent twisting during use and for optimum vertical guidance. Preferably, as shown in FIG. 1, lower portion 46 includes a pair of opposed channels 50. The adjustable column 42 may be held in position by any of a variety of mechanisms, such as one or more fasteners (e.g., screws, bolts, pins, rivets, carriage bolts, and wingnuts, etc.), to allow easy adjustment with optimum holding power. Vertical adjustment is intended to accommodate a variety of work tools such as free-standing table saws, joiners, planers, combination machines and the like. For other objects, such as plastic or copper pipe, the work support could be used for cutting, soldering, welding, etc.

It is also important to note that the construction and arrangement of the elements of an adjustable work support as shown in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the work surfaces may be any of a variety of functional configurations for a variety of tasks. Also the mechanism that allows for reconfiguring the header may include a variety of hinge and locking mechanisms. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A work support comprising:
   a frame including a bracket;
   a header rotatably coupled to the bracket by a pair of projections engaged with corresponding apertures, the header includes a first work surface located on a first end thereof, and a second work surface located on a second opposing end thereof, the header being rotatable 360° within the bracket;

the header and each work surface being rotatable between a first position where the first work surface faces upward, the second work surface faces downward and the projections are received in the apertures and a second position where the second work surface faces upward, the first work surface faces downward and the projections are received in the apertures, the header rotating approximately 180° in either direction between the first and second positions.

2. The work support of claim 1 wherein the projections extend from sides of the header.

3. The work support of claim 1 wherein the header comprises at least one detent and the bracket comprises at least one recess to secure the header in the first and second positions.

4. The work support of claim 3 wherein the detent is disposed on the header.

5. The work support of claim 1 wherein the header is made of plastic.

6. The work support of claim 1 wherein the first work surface is a roller and the second work surface is a plurality of rollers having a first axis of rotation which is opposite of a second axis of rotation of the roller.

7. A work support comprising:

a frame including a bracket;

a header rotatably coupled to the bracket, a first work surface disposed at a first end of the header and comprising a single roller, and a second work surface disposed at a second opposing end of the header and comprising a plurality of rollers with multiple axes of rotation at least one of which is perpendicular to an axis of rotation of the single roller;

the header being rotatable 360° in either direction about a pair of projections between a first position and a second position which are 180° apart, the first work surface facing upward and the second work surface facing downward when the header is in the first position and the second work surface facing upward and the first work surface facing downward when the header is in the second position.

8. The work support of claim 7 wherein the projections extend from the header.

9. The work support of claim 8 wherein the header comprises at least one detent and the bracket comprises at least one recess to secure the header in the first and second positions.

10. The work support of claim 7 wherein the header is made of plastic.

* * * * *